United States Patent
Khan

(10) Patent No.: US 8,856,029 B1
(45) Date of Patent: Oct. 7, 2014

(54) SYSTEMS AND METHODS FOR REGULATING THE RECEIPT OF DATA TRANSMITTED FROM A MESSAGING DEVICE

(75) Inventor: Kaiser W. Khan, Sydney (AU)

(73) Assignee: Symantec Corporation, Mountain View, CA (US)

( * ) Notice: Subject to any disclaimer, the term of this patent is extended or adjusted under 35 U.S.C. 154(b) by 368 days.

(21) Appl. No.: 12/861,363

(22) Filed: Aug. 23, 2010

(51) Int. Cl.
*G06Q 30/00* (2012.01)
*H04W 4/20* (2009.01)
*G06Q 30/02* (2012.01)

(52) U.S. Cl.
CPC ........... *H04W 4/206* (2013.01); *G06Q 30/0207* (2013.01)
USPC ...................................................... 705/14.58

(58) Field of Classification Search
CPC ... G06Q 30/02; G06Q 50/01; G06Q 30/0207; G06Q 30/00; G06Q 30/0222; G06Q 30/0226; H04W 4/02; H04W 4/206; H04L 51/04; H04L 67/18
See application file for complete search history.

(56) References Cited

U.S. PATENT DOCUMENTS

| | | | | |
|---|---|---|---|---|
| 5,298,883 | A * | 3/1994 | Pilney et al. ................ | 340/573.2 |
| 7,266,836 | B2 * | 9/2007 | Anttila et al. ................. | 725/133 |
| 7,283,830 | B2 * | 10/2007 | Buckley ........................ | 455/466 |
| 7,308,269 | B2 * | 12/2007 | Laitinen et al. ............... | 455/450 |
| 7,761,912 | B2 * | 7/2010 | Yee et al. ......................... | 726/11 |
| 7,925,516 | B2 * | 4/2011 | McCann et al. ............... | 705/1.1 |
| 7,937,480 | B2 * | 5/2011 | Alperovitch et al. ......... | 709/229 |
| 8,060,062 | B2 * | 11/2011 | Kim ............................ | 455/412.2 |
| 8,254,961 | B2 * | 8/2012 | Moon et al. ................. | 455/456.3 |
| 8,396,759 | B2 * | 3/2013 | Mehta et al. ................. | 705/26.7 |
| 2004/0125958 | A1 * | 7/2004 | Brewster et al. ............. | 380/270 |
| 2004/0219882 | A1 * | 11/2004 | Laitinen et al. .............. | 455/41.2 |
| 2004/0237109 | A1 * | 11/2004 | Laitinen et al. ................. | 725/62 |
| 2006/0256012 | A1 * | 11/2006 | Fok et al. ....................... | 342/457 |
| 2007/0130351 | A1 * | 6/2007 | Alperovitch et al. ......... | 709/229 |
| 2008/0022384 | A1 * | 1/2008 | Yee et al. ......................... | 726/11 |
| 2009/0138363 | A1 * | 5/2009 | Arnold et al. ................... | 705/14 |
| 2009/0234663 | A1 * | 9/2009 | McCann et al. .................. | 705/1 |
| 2010/0087211 | A1 * | 4/2010 | Hurd ............................ | 455/466 |
| 2010/0125491 | A1 * | 5/2010 | Elliott et al. ................. | 705/14.4 |
| 2010/0318794 | A1 * | 12/2010 | Dierickx ....................... | 713/164 |
| 2011/0029380 | A1 * | 2/2011 | Moukas et al. ............ | 705/14.49 |
| 2011/0143708 | A1 * | 6/2011 | Zellner et al. ............... | 455/404.2 |
| 2011/0159890 | A1 * | 6/2011 | Fortescue et al. .......... | 455/456.2 |
| 2011/0289308 | A1 * | 11/2011 | Sobko et al. ................. | 713/100 |
| 2011/0320307 | A1 * | 12/2011 | Mehta et al. ................. | 705/26.7 |
| 2011/0320462 | A1 * | 12/2011 | Bao et al. ...................... | 707/749 |
| 2012/0052881 | A1 * | 3/2012 | Heffez ........................ | 455/456.3 |
| 2012/0196646 | A1 * | 8/2012 | Crinon et al. ................ | 455/524 |
| 2012/0329482 | A1 * | 12/2012 | Chandra et al. ............ | 455/456.2 |

OTHER PUBLICATIONS

Website: http://en.wikipedia.org/wiki/Bluetooth, *Bluetooth*, from Wikipedia, Sep. 2010 (21 pgs.).

(Continued)

*Primary Examiner* — Michael R Vaughan
(74) *Attorney, Agent, or Firm* — Holland & Hart LLP

(57) ABSTRACT

A computer-implemented method for regulating the receipt of data transmitted from a messaging device is described. A security application that includes a blocking application is initialized. At least one setting for the blocking application is initialized. Incoming data transmitted from the messaging device are detected. At least a portion of the incoming data is blocked based on the initialized at least one setting for the blocking application.

14 Claims, 7 Drawing Sheets

(56) References Cited

OTHER PUBLICATIONS

Website: http://www.symantec.com/norton/smartphone-security, *Norton Smartphone Security for Symbian, Windows Mobile: Protect Your Mobile Device and the Information on It*, Symantec 2010 (2 pgs.).

Website: http://www.filebuzz.com/fileinfo/41303/Fexmax_Bluetooth_Marketing_Software.html, *Fexmax Bluetooth Marketing Software* v2.0, Sep. 13, 2010 (2 pgs.).

Website: http://bluetoothadvertising.com.au/, *Bluetooth Advertising: What We Can Do for You*, Sep. 13, 2010 (1 pg.).

Website: http://bluetoothadvertising.com.au/how_it_works.html, *Bluetooth Advertising: How It Works*, Sep. 13, 2010 (1 pg.).

* cited by examiner

SYSTEMS AND METHODS FOR REGULATING THE RECEIPT OF DATA TRANSMITTED FROM A MESSAGING DEVICE

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often requires human and computer interaction. Users of computer technologies continue to demand that the efficiency of these technologies increase. Improving the efficiency of computer technologies is important to anyone that uses and relies on computers.

Computing devices may be mobile so that users may carry these systems as they travel, shop, work, etc. Devices, such as marketing and messaging devices, may be placed at various locations to transmit data to these mobile computing devices. For example, marketing devices may be placed in a shopping center. The marketing devices may transmit advertising materials to the mobile computing devices that are in a certain proximity of the marketing devices. The user of a mobile computing device may view the advertising content for a particular vendor via the mobile computing device.

Users, however, may not desire to receive unsolicited advertising content from marketing devices. As a result, benefits may be realized by providing systems and methods for regulating the receipt of data transmitted from a messaging device. In particular, benefits may be realized by providing systems and methods for regulating the receipt of advertising content transmitted from a proximity marketing device.

SUMMARY

According to at least one embodiment, a computer-implemented method for regulating the receipt of data transmitted from a messaging device is described. A security application that includes a blocking application is initialized. At least one setting for the blocking application is initialized. Incoming data transmitted from the messaging device are detected. At least a portion of the incoming data is blocked based on the initialized at least one setting for the blocking application.

In one embodiment, the messaging device is a Bluetooth broadcasting device. The data may be transmitted from the messaging device via a Bluetooth protocol.

In one example, a general setting for the blocking application may be selected to block each portion of incoming data transmitted from the messaging device. A keyword setting may be selected for the blocking application to block incoming data that include a keyword. In one configuration, a time setting for the blocking application may be selected to block incoming data that are detected during a predetermined time slot. A location setting may be selected for the blocking application to block incoming data detected in a predetermined location.

In one embodiment, the location setting may be selected via a Global Positioning System (GPS). At least one setting for a plurality of users may be stored in a database. A statistical report indicating a percentage of the at least one settings stored in the database for the plurality of users may be generated.

A computing device configured to regulate the receipt of data transmitted from a proximity messaging device is also described. The computing device may include a processor and memory in electronic communication with the processor. The device may include a security module that includes a blocking module. The blocking module may be configured to set at least one setting relating to the receipt of data transmitted from the proximity messaging device, and detect incoming data transmitted from the proximity messaging device. The blocking module may further be configured to block at least a portion of the incoming data based on the initialized at least one setting relating to the receipt of the data transmitted from the proximity messaging device.

A computer-program product for regulating the receipt of data transmitted from a messaging device is also described. The computer-program product may include a computer-readable medium having instructions thereon. The instructions may include code programmed to initialize a security application that includes a blocking application, and code programmed to initialize at least one setting for the blocking application. The instructions may further include code programmed to detect incoming data transmitted from the messaging device, and code programmed to block at least a portion of the incoming data based on the initialized at least one setting for the blocking application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
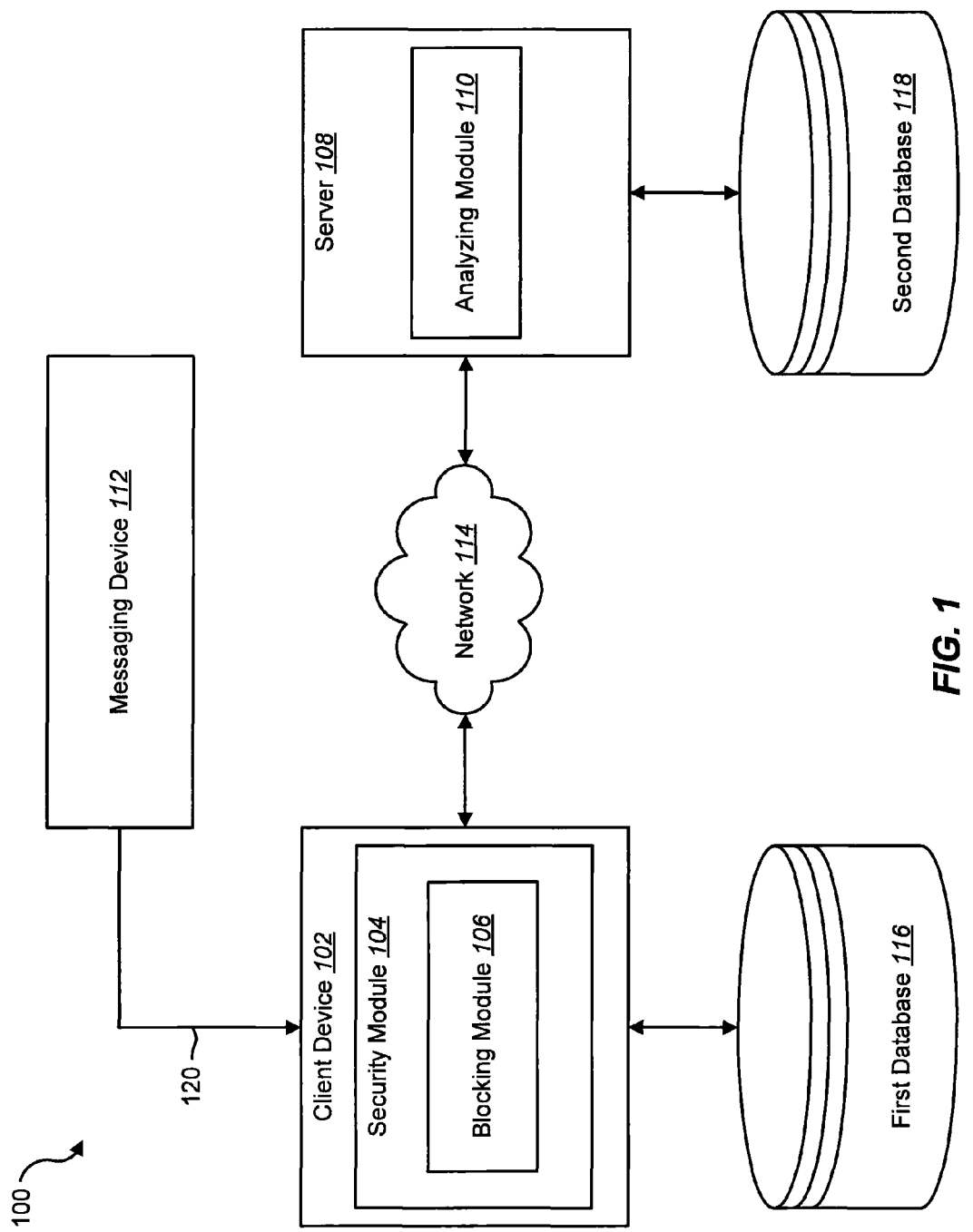
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Proximity marketing is the localized wireless distribution of advertising content (or other type of marketing data) associated with a particular place or item. The transmissions may be received by individuals in that location who have a device receive such transmissions. Distribution of the advertising materials may be via a traditional, localized broadcast, or more commonly is specifically targeted to devices known to be in a particular area. The location of a device may be determined by a cellular phone being in a particular cell, a Bluetooth or WiFi enabled device being within range of a transmitter, an Internet-enabled device with a global positioning system (GPS), and the like. In addition to targeting devices within a certain location, transmissions of advertising content may be further targeted to specific groups within the certain location. For example, advertising content in tourist hotspots may only be distributed to devices that are registered outside of the local area.

As previously mention, Bluetooth, a short-range wireless system supported by mobile devices, is one transmission medium that may be used to transmit communications associated with proximity marketing. The process of Bluetooth-based proximity marketing may involve setting up proximity marketing equipment at a particular location, enabling the equipment to discover other Bluetooth enabled devices that are located in proximity to the equipment, and then transmitting data to these discovered devices. The data may be sent in the form of texts, images, audio or video. Receiving advertising materials from proximity marketing equipment, however, may be annoying to a user. For example, a user may receive an unsolicited pop-up advertising message on his/her mobile phone simply because the mobile phone is discovered by the proximity marketing equipment and is proximate to the location of the marketing equipment.

The present systems and methods may provide options to the user to block or limit the advertisements received from proximity marketing devices. For example, the present systems and methods may allow the user to set up a mobile device to completely block advertisements transmitted from proximity marketing devices. In addition, the present systems and methods may enable the user to set up the mobile device to filter the types of advertisements transmitted from the proximity marketing device. Details regarding the various settings the user may initialize on the mobile device will be described below.

FIG. 1 is a block diagram illustrating one embodiment of an environment 100 in which the present systems and methods may be implemented. In one configuration, a client device 102 may include a security module 104. The client device 102 may be a cellular phone, a Smartphone, a personal digital assistant (PDA), or any other device that includes the ability to communicate with other devices via short-range wireless protocols.

The security module 104 may include a blocking module 106. The blocking module 106 may block or filter incoming data that are transmitted to the client device 102. Based on settings initialized on the blocking module 106, the blocking module 106 may determine whether to prevent the incoming data from being received at the client 102. In addition, the blocking module 106 may filter the incoming data so that the client 102 receives incoming data that satisfies certain criteria.

In one example, a messaging device 112 may be in a location proximate to the location of the client device 102. The messaging device 112 may be proximity marketing equipment. In one configuration, the marketing device 112 may be a Bluetooth broadcasting device that discovers other devices in the location proximate to the messaging device 112, and transmits data to these discovered devices using Bluetooth technology.

As previously mentioned, a user may provide one or more settings to configure the blocking module 106. In addition, the one or more settings may be initialized automatically with no input from the user. The settings may indicate whether the blocking module 106 is to completely prevent or block incoming data from being received at the client 102. In addition, the settings may indicate whether the blocking module 106 is to allow a certain types of data to be received at the client 102. The settings of the blocking module 106 may be stored in a first database 116. The first database 116 may be incorporated as part of the client device 102. For example, the settings for the blocking module 106 may be stored in internal memory of the client device 102.

In one embodiment, the client device 102 may communicate with a server 108 across a network connection 114. The network connection 114 may be a local area network (LAN), a wide area network (WAN), and the like. While FIG. 1 only illustrates the server 108 in communication with a single client device 102, it is to be understood that the server 108 may communicate with more than one client device across the network connection 114.

In one configuration, the server 108 may include an analyzing module 110. The analyzing module 110 may analyze data that are stored in a second database 118. As an example, the settings for the blocking module 106 may be transmitted to the server 108 across the network connection 114. The settings for the blocking module 106 may be stored in the second database 118. The analyzing module 110 may analyze the settings received from each client device in communication with the server 108. As a result, the second database 118 may store settings for a plurality of blocking modules 106 installed on a plurality of client devices.

Figure 2:
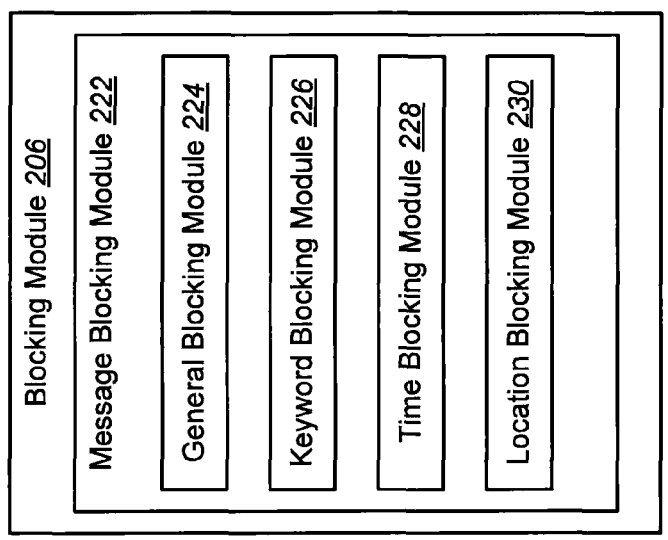
FIG. 2 is a block diagram illustrating one embodiment of a blocking module that may be implemented with the present systems and methods.

FIG. 2 is a block diagram illustrating one embodiment of a blocking module 206 that may be implemented with the present systems and methods. In one configuration, the blocking module 206 may include a message blocking module 222. The message blocking module 222 may block or prevent all messages transmitted to a client device 102. In addition, the message blocking module 222 may block or prevent messages transmitted to the client device 102 that do not satisfy at least one setting. For example, the message blocking module 222 may block or prevent all of the advertising messages transmitted from a messaging device 112, such as a Bluetooth proximity marketing device. The message blocking module 222 may also block only those messages that do not satisfy at least one setting previously provided by the user. As a result, the message blocking module 222 may allow messages to be received at the client device 102 that do satisfy the provided settings. In one example, the message blocking module 222 may completely block or partially block advertisements, coupons, or other messages transmitted from the messaging device 112.

As previously explained, the user may provide one or more settings for the message blocking module 222. In one example, the message blocking module 222 may include a general blocking module 224. The user may provide a setting for the general blocking module 224. For example, if the user enables the general blocking module 222, the message blocking module may block all messages transmitted from the messaging device 112. As an example, the client 102 may be enabled to be discoverable via Bluetooth by other devices (e.g., the messaging device 112). If the user has provided the appropriate settings for the general blocking module 224, the module 224 place the client 102 in a "hidden state" so that the client 102 appears "hidden" to other devices. In other words, the client 102 will not be discoverable via Bluetooth by other devices, including the messaging device 112. If the client 102 is undiscoverable by the messaging device 112, the device 112 will not be able to transmit advertisement content (or other types of marketing data) to the client 102. The general blocking module 224 may also allow a user to confirm to delete previously listed devices that discovered client 102.

In one embodiment, even though the client 102 may be undiscoverable by the messaging device 112, the general blocking module 224 may allow the user the option to be discoverable by other devices (e.g., devices belonging to a third party known to the user). For example, the user of a client device 102 that includes Bluetooth capabilities may simply turn off a Bluetooth visibility feature so that the client device 102 is undiscoverable by all other devices. This does not give, however, the user the option to be visible and also block advertising messages transmitted via Bluetooth from the messaging device 112. In other words, the user may try to connect to a friend's mobile phone via Bluetooth to transfer data, such as photos. If the user is near a messaging device 112, such as a Bluetooth advertiser, the user's device may receive an advertisement message when the user activates the Bluetooth visibility feature because the user's device is now discoverable by the messaging device 112. With the present systems and methods, the user may have the option to share data with friends and also block messages, such as advertisements transmitted from a messaging device located in a certain place, during a certain time, or that include (or do not include) certain keywords without interruptions.

The message blocking module 222 may also include a keyword blocking module 226. A user may provide settings for the keyword blocking module 226. The user may identify one or more keywords. In one configuration, the keyword blocking module 226 may block or prevent messages transmitted from the messaging device 112 that include the identified one or more keywords. Messages that do not include the one or more identified keywords may be allowed by be received by the client device 102. Alternatively, the keyword blocking module 226 may allow messages that include the identified one or more keywords and prevent or block messages transmitted from the messaging device 112 that do include the identified one or more keywords.

In one embodiment, the message blocking module 222 may further include a time blocking module 228. A user may provide a setting for the time blocking module 228 that identifies a certain time slot (e.g., 9 a.m.-5 p.m. weekdays). As a result, messages transmitted from the messaging device 102 during the identified time slot may be blocked at the client device 102. The time blocking module 228 may allow messages received outside of the identified time slot to be received by the client device 102.

In one configuration, the message blocking module 222 may include a location blocking module 230. A user may provide a setting for the location blocking module 230. In one example, the setting may indicate that messages transmitted from the messaging device 112 that is located in a particular area are to be blocked and not received at the client device 102. For example, the user may provide a first setting for the location blocking module 230 that indicates that when the client device 102 is in a first location, messages transmitted from one or all messaging devices 112 in the first location are to be block or prevented from being received by the client device 112. Messages, however, transmitted from a messaging device 112 in a second location may be received by the client device 112.

Figure 3:
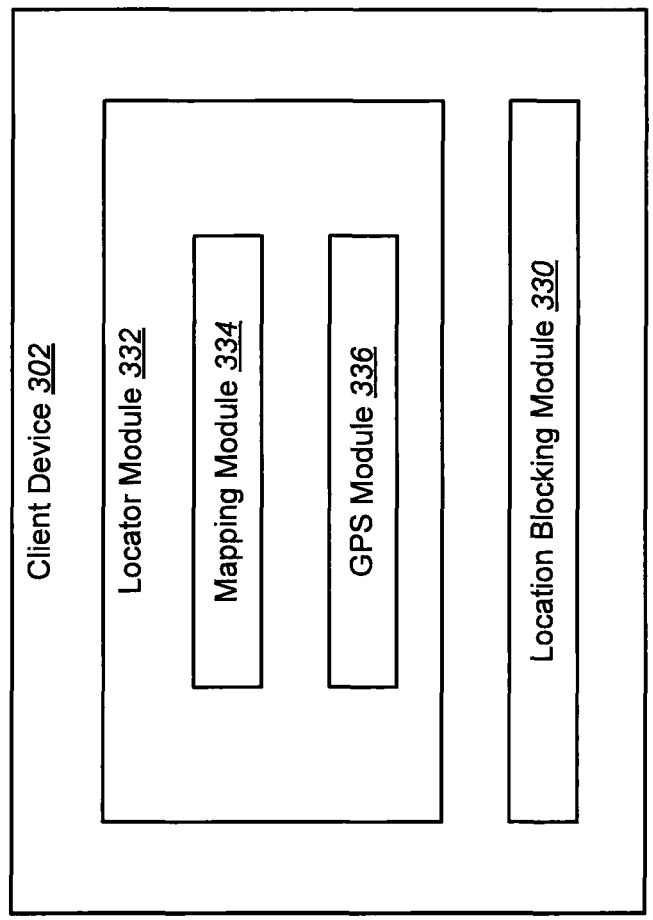
FIG. 3 is a block diagram illustrating one embodiment of a client device.

FIG. 3 is a block diagram illustrating one embodiment of a client device 302. The client device 302 may include a locator module 332. In one example, the locator module 332 may include a mapping module 334 and a GPS module 336 to determine the location of the client device 302. The determination may be done automatically, or by a user of the client device 302.

As previously explained, the client device 302 may include a location blocking module 330. The location blocking module 330 may be part of the message blocking module 222. The user of the client device 302 may provide settings for the location blocking module 330 to regulate the messages (or other types of data) transmitted to the client device 302 in a particular location. In one embodiment, the user may interact with the locator module 332 to select locations in which messages transmitted from a messaging device in the selected locations are to be blocked. The user may select the locations via the mapping module 334. The mapping module 334 and the GPS module 336 may also determine the present location of the client device 302. The location blocking module 330 may determine whether to block a transmitted message from a messaging device based on the settings provided by the user and the current location of the client device 302 provided by the locator module 332. The user may also provide settings for the location blocking module 330 to allow messages transmitted from a messaging device 112 in a certain area. The area may be determined via the mapping module 334. The location blocking module 330 may obtain the current location of the client device 302 from the locator module 332 and determine whether to allow a transmitted message based on the settings and the current location of the client device 302.

Figure 4:
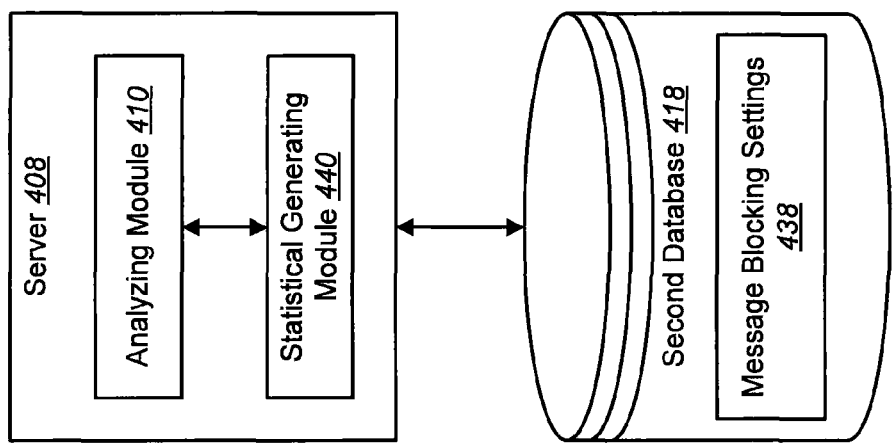
FIG. 4 is a block diagram illustrating one embodiment of server in communication with a database.

FIG. 4 is a block diagram illustrating one embodiment of server 408 in communication with a second database 418. The second database 418 may store message blocking settings 438 for one or more users. As previously explained, the server 408 may also include an analyzing module 410. The analyzing module 410 may analyze the message blocking settings 438 stored in the second database 418. In one embodiment, a statistical generating module 440 may generate a statistical report identifying the various settings provided by the various users. For example, the statistical generating module 440 may generate a report that indicates the majority of keywords provided by various users to block or allow advertisement messages that include or do not include these keywords. The report may also indicate the percentage of users that have selected a particular time slot to receive or block messages transmitted from a certain messaging device 112. The report may further indicate the locations the various users have selected to receive or block messages transmitted from the messaging device 112.

Figure 5:
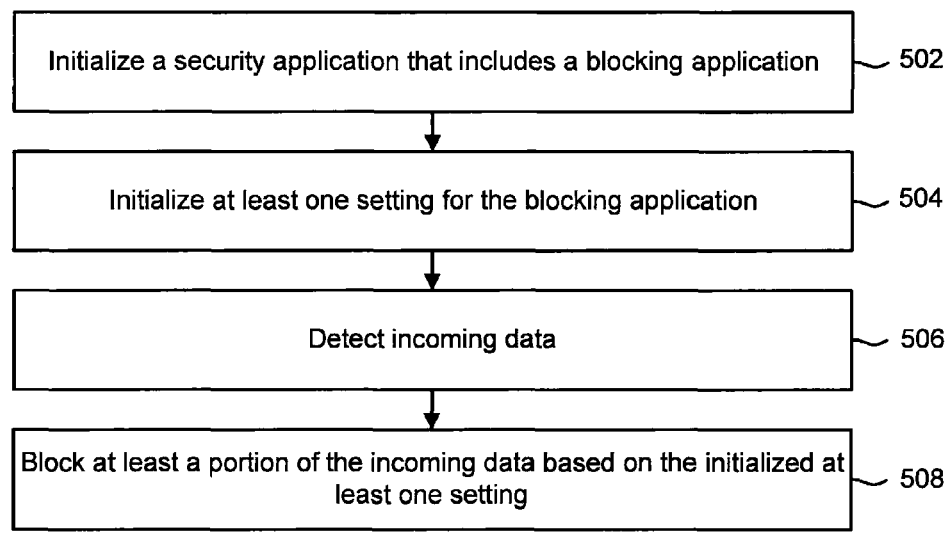
FIG. 5 is a flow diagram illustrating one embodiment of a method for regulating the receipt of data transmitted from a messaging device.

FIG. 5 is a flow diagram illustrating one embodiment of a method 500 for regulating the receipt of data transmitted from a messaging device 112. In one configuration, the method 500 may be implemented by the blocking module 106. The messaging device 112 may be proximity marketing device that transmits advertisement content via Bluetooth to other Bluetooth enabled devices, such as the client device 102.

In one example, a security application installed on the client device 102 may be initialized 502. The security application may include a blocking application that includes one or more settings, filters, etc. In one embodiment, at least one setting or filter may be initialized 504 without any input from a user. In one example, at least one setting for the blocking application may be selected by the user. Incoming data may be detected 506. For example, the client device 102 may detect advertising content being transmitted from the messaging device 112. In one embodiment, at least a portion of the incoming data may be blocked 508 based on the selected at least one setting. For example, the selected settings may cause the blocking application to block all of the incoming data from the messaging device 112. The selected settings may cause the blocking application to block only the incoming data that includes (or does not include) at least one keyword identified by a user. Further, the selected settings may cause the blocking application to block (or allow) only the incoming data that is transmitted during a time slot specified by the user in the selected settings. In addition, the selected settings may cause the blocking application to block (or allow) only the incoming data that is transmitted from a messaging device in a location specified by the user in the selected settings.

Figure 6:
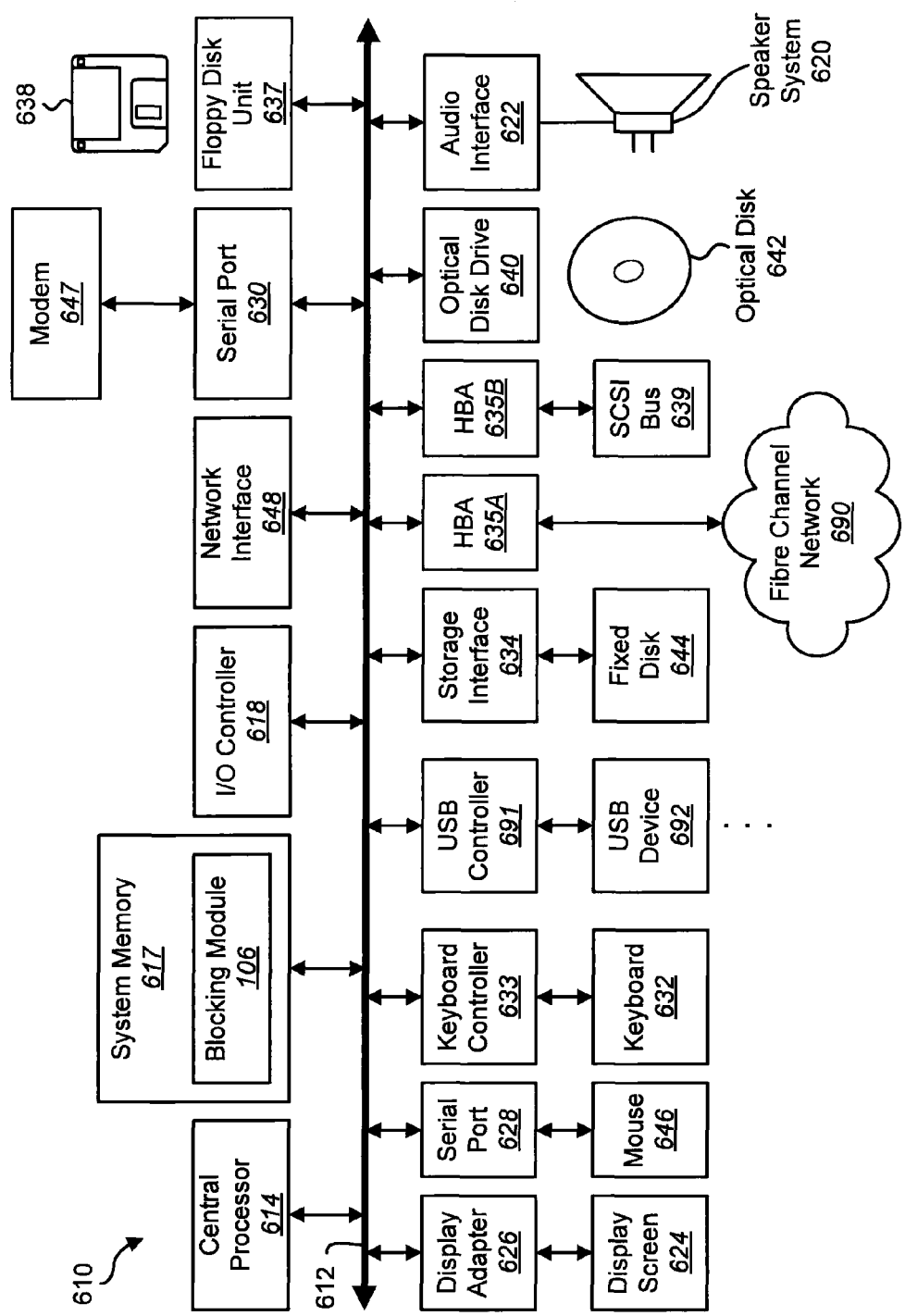
FIG. 6 depicts a block diagram of a computer system suitable for implementing the present systems and methods.

FIG. 6 depicts a block diagram of a computer system 610 suitable for implementing the present systems and methods. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), multiple USB devices 692 (interfaced with a USB controller 690), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the blocking module 106 to implement the present systems and methods may be stored within the system memory 617. Applications resident with computer system 610 are generally stored on and accessed via a computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present systems and methods. The devices and subsystems can be interconnected in different ways from that shown in FIG. 6. The operation of a computer system such as that shown in FIG. 6 is readily known in the art and is not discussed in detail in this application. Code to implement the present disclosure can be stored in computer-readable medium such as one or more of system memory 617, fixed disk 644, optical disk 642, or floppy disk 638. The operating system provided on computer system 610 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
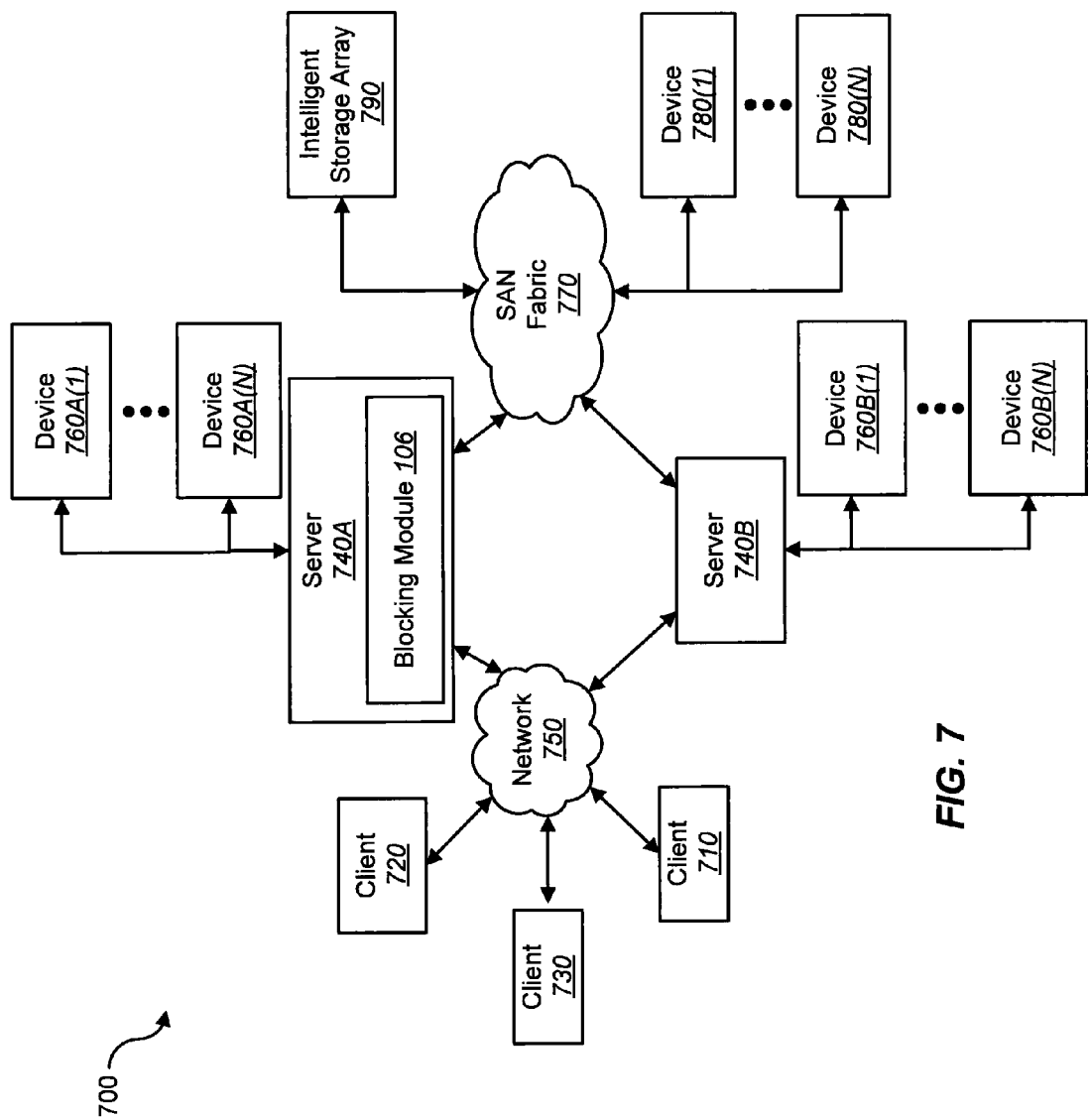
FIG. 7 is a block diagram depicting a network architecture in which client systems, as well as storage servers (any of which can be implemented using computer system), are coupled to a network.

FIG. 7 is a block diagram depicting a network architecture 700 in which client systems 710, 720 and 730, as well as storage servers 740A and 740B (any of which can be implemented using computer system 610), are coupled to a network 750. In one embodiment, the blocking module 106 may be located within a server 740A, 740B to implement the present systems and methods. The storage server 740A is further depicted as having storage devices 760A(1)-(N) directly attached, and storage server 740B is depicted with storage devices 760B(1)-(N) directly attached. SAN fabric 770 supports access to storage devices 780(1)-(N) by storage servers 740A and 740B, and so by client systems 710, 720 and 730 via network 750. Intelligent storage array 790 is also shown as an example of a specific storage device accessible via SAN fabric 770.

With reference to computer system 610, modem 647, network interface 648 or some other method can be used to provide connectivity from each of client computer systems 710, 720, and 730 to network 750. Client systems 710, 720, and 730 are able to access information on storage server 740A or 740B using, for example, a web browser or other client software (not shown). Such a client allows client systems 710, 720, and 730 to access data hosted by storage server 740A or 740B or one of storage devices 760A(1)-(N), 760B(1)-(N), 780(1)-(N) or intelligent storage array 790. FIG. 7 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for regulating the receipt of data transmitted from a messaging device, comprising:
    initializing a security application that includes a blocking application;
    automatically configuring user settings for the blocking application, the automatically configured user settings being based at least in part on a statistical report indicating one or more settings of a plurality of users, wherein the automatically configured user settings include any combination of keyword, time, and location settings, the keyword, time, and location settings being based on settings of a majority of the plurality of users from the statistical report;
    detecting incoming data transmitted from the messaging device, the incoming data comprising advertisement data, wherein the messaging device is a short-range broadcasting device; and
    blocking the incoming data from being displayed on the messaging device, the incoming data being blocked based on at least the automatically configured user settings for the blocking application.

2. The method of claim 1, wherein the messaging device is a Bluetooth broadcasting device.

3. The method of claim 1, wherein the data are transmitted from the messaging device via a Bluetooth protocol.

4. The method of claim 1, further comprising selecting a general setting for the blocking application to block each portion of incoming data transmitted from the messaging device.

5. The method of claim 1, further comprising selecting the location setting via a Global Positioning System (GPS).

6. The method of claim 1, further comprising storing at least one setting for the plurality of users in a database.

7. The method of claim 6, wherein the statistical report indicates a percentage of the plurality of users using a particular setting of the one or more settings.

8. A computing device configured to regulate the receipt of data transmitted from a proximity messaging device, comprising:
    a processor;
    memory in electronic communication with the processor;
    instructions stored in the memory, the instructions being executable by the processor to:
        automatically configure user settings for the blocking application, the automatically configured user settings being based at least in part on a statistical report indicating one or more settings of a plurality of users, wherein the automatically configured user settings include any combination of keyword, time, and location settings, the keyword, time, and location settings being based on settings of a majority of the plurality of users from the statistical report;
        detect incoming data transmitted from the proximity messaging device, the incoming data comprising advertisement data, wherein the messaging device is a short-range broadcasting device; and
        block the incoming data from being displayed on the messaging device, the incoming data being blocked based on at least the automatically configured user settings for the blocking application.

9. The computing device of claim 8, wherein the proximity messaging device is a Bluetooth broadcasting device.

10. The computing device of claim 8, wherein the data are transmitted from the proximity messaging device via a Bluetooth protocol.

11. The computing device of claim 8, wherein the instructions are executable by the processor to:
    set a general setting to block each portion of incoming data transmitted from the proximity messaging device.

12. The computing device of claim 8, wherein the instructions are executable by the processor to:

set the location setting via a Global Positioning System (GPS).

13. A computer-program product for regulating the receipt of data transmitted from a messaging device, the computer-program product comprising a non-transitory computer-readable medium storing instructions thereon, the instructions comprising:
- initialize a security application that includes a blocking application;
- automatically configure user settings for the blocking application, the automatically configured user settings being based at least in part on a statistical report indicating one or more settings of a plurality of users, wherein the automatically configured user settings include any combination of keyword, time, and location settings, the keyword, time, and location settings being based on settings of a majority of the plurality of users from the statistical report;
- detect incoming data transmitted from the messaging device, the incoming data comprising advertisement data, wherein the messaging device is a short-range broadcasting device; and
- block the incoming data from being displayed on the messaging device, the incoming data being blocked based on at least the automatically configured user settings for the blocking application.

14. The computer-program product of claim 13, wherein the messaging device is a Bluetooth broadcasting device.

* * * * *